US008279508B2

(12) United States Patent
Nakazono et al.

(10) Patent No.: US 8,279,508 B2
(45) Date of Patent: Oct. 2, 2012

(54) OPTICAL REFLECTION ELEMENT

(75) Inventors: Shinsuke Nakazono, Osaka (JP);
Soichiro Hiraoka, Hyogo (JP); Jirou Terada, Osaka (JP); Shigeo Furukawa, Osaka (JP); Kiyomi Furukawa, legal representative, Osaka (JP); Toshiaki Horie, Osaka (JP); Kazuki Komaki, Osaka (JP); Masaki Tada, Osaka (JP); Yuta Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/265,139

(22) PCT Filed: Apr. 16, 2010

(86) PCT No.: PCT/JP2010/002772
§ 371 (c)(1),
(2), (4) Date: Jan. 23, 2012

(87) PCT Pub. No.: WO2010/122751
PCT Pub. Date: Oct. 28, 2010

(65) Prior Publication Data
US 2012/0113492 A1    May 10, 2012

(30) Foreign Application Priority Data

Apr. 21, 2009  (JP) ................................ 2009-102588

(51) Int. Cl.
*G02B 26/08* (2006.01)
(52) U.S. Cl. ................ 359/199.4; 359/199.1; 359/200.8
(58) Field of Classification Search .... 359/198.1–199.1, 359/199.4, 200.8
See application file for complete search history.

(56) References Cited

U.S. PATENT DOCUMENTS

| 2007/0041069 | A1* | 2/2007 | Oettinger et al. ............ 359/214 |
| 2008/0165402 | A1  | 7/2008 | Nakamura et al. |
| 2011/0032590 | A1  | 2/2011 | Terada et al. |
| 2011/0122471 | A1  | 5/2011 | Terada et al. |

FOREIGN PATENT DOCUMENTS

| JP | 2005-148459 | 6/2005 |
| JP | 2008-040240 | 2/2008 |
| JP | 2008-193890 | 8/2008 |
| WO | 2009/028152 | 3/2009 |
| WO | 2009/130902 | 10/2009 |

OTHER PUBLICATIONS

International Search Report of PCT Application No. PCT/JP2010/002772, dated May 25, 2010.

* cited by examiner

*Primary Examiner* — James Phan
(74) *Attorney, Agent, or Firm* — Panasonic Patent Center (57) ABSTRACT

An optical reflecting element includes a mirror, and a pair of high-frequency vibrators and a pair of low-frequency vibrators for vibrating the mirror. The high-frequency vibrators include a substrate, a bottom electrode layer formed on the substrate, a piezoelectric layer, and a drive electrode and a first monitor electrode as the top electrode layer. One end of the low-frequency vibrator has the substrate shared with the high-frequency vibrator, a bottom electrode layer, a piezoelectric layer, a drive electrode, and a second monitor electrode as the top electrode layer. The other end of the low-frequency vibrator has the substrate shared with the high-frequency vibrator, a bottom electrode layer, a piezoelectric layer, a drive electrode, a first monitor electrode, and an insulator layer as a dead zone for preventing a piezoelectric effect due to the piezoelectric layer from reaching the first monitor electrode. The first monitor electrode provided on the low-frequency vibrator is connected from the top of the vibrator to an extraction electrode.

10 Claims, 10 Drawing Sheets

OPTICAL REFLECTION ELEMENT

TECHNICAL FIELD

The present invention relates to an optical reflecting element used for an image projector such as a heads-up display and a head-mounted display.

BACKGROUND ART

Figure 10:
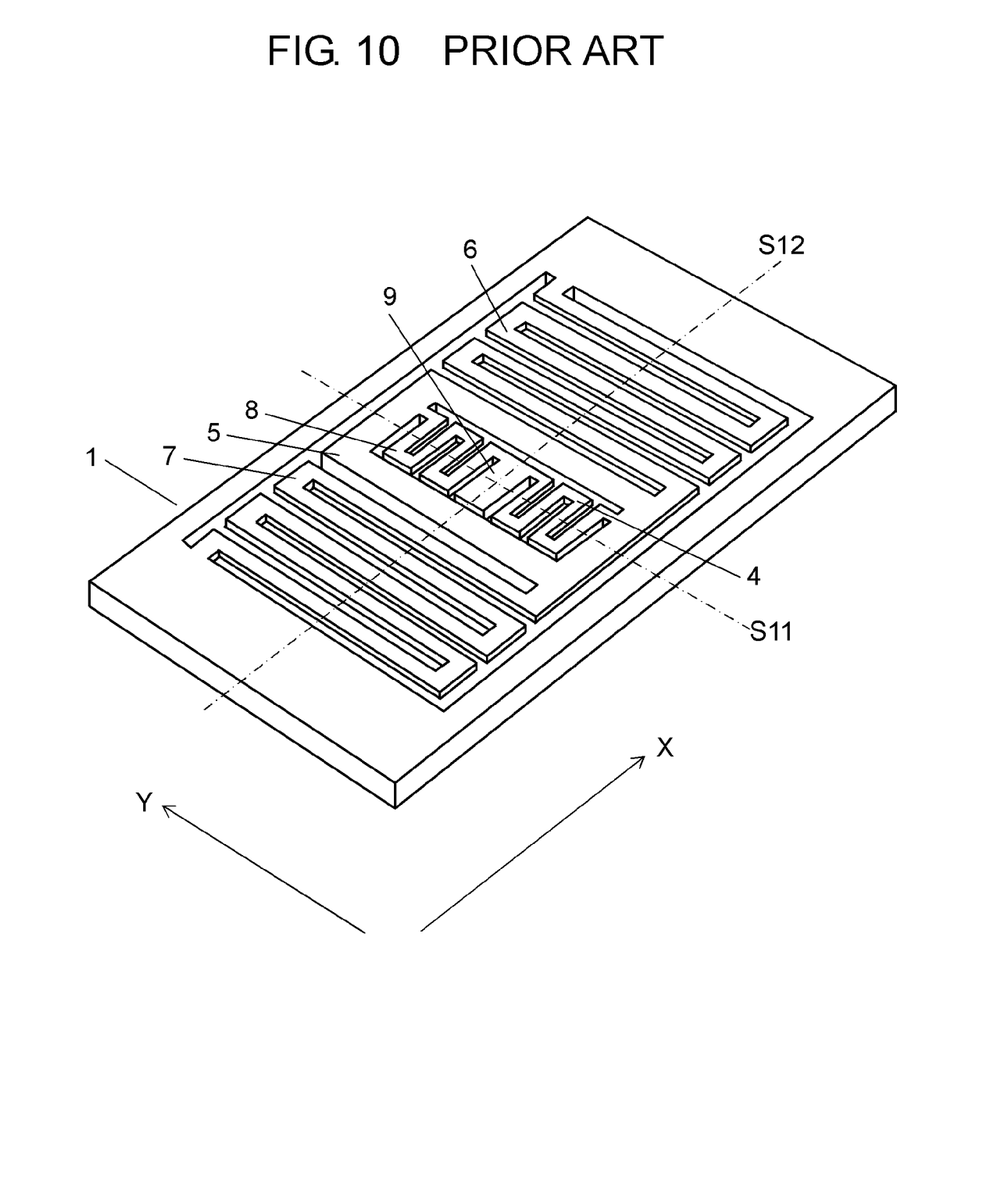
FIG. 10 is a perspective view of a conventional optical reflecting element.

FIG. 10 is a perspective view of a conventional, biaxially driven optical reflecting element. Optical reflecting element 1 includes a pair of vibrators 4 and 8, frame 5, a pair of vibrators 6 and 7, and mirror 9. Vibrators 4 and 8 are connected to the end of mirror 9. Frame 5 is connected to vibrators 4 and 8, and encloses the outer circumference of vibrators 4 and 8 and mirror 9. Vibrators 6 and 7 are connected to frame 5 at each end outside frame 5. Vibrators 4 and 8 have central axis S11 parallel with the Y axis; vibrators 6 and 7 have central axis S12 parallel with the X axis. Vibrators 4, 8, 6, and 7 are meander-shaped.

Each of vibrator 4, 8, 6, and 7 has a drive element (not shown) disposed thereon composed of a bottom electrode layer, a piezoelectric layer, and a top electrode layer. Applying voltage to this drive element enables rotating mirror 9 about central axes S11 and S12. Launching light to mirror 9 allows its reflected light to scan on the flat surface of a screen, thereby projecting images on such as a wall and screen.

Each of vibrator 4, 8, 6, and 7 and mirror 9 are further provided thereon with a monitor element (not shown) composed of a bottom electrode layer, a piezoelectric layer, and a top electrode layer. When an electric signal detected with the monitor element is input into the upper electrode of the drive element through a feedback circuit, optical reflecting element 1 can be always driven at a resonance frequency theoretically. Such a self-excited driving method allows maintaining a large amplitude. Such optical reflecting element 1 is disclosed in patent literature 1 for example.

In recent years, highly accurate self-excited driving has been required in biaxial optical reflecting elements. This is because highly accurate self-excited driving stably produces a large deflection angle independently of variation in resonance frequency. In a biaxial optical reflecting element, however, an electrode for monitoring the X axis is structurally forced to pass over a beam for driving the Y axis. Consequently, the electrode for monitoring the X axis results in receiving a signal in a higher-order vibration mode from the Y-axis-driving beam. The signal becomes spurious resonance noise, which prevents appropriate self-excited driving.

CITATION LIST

Patent Literature

PTL 1 Japanese Patent Unexamined Publication No. 2008-040240

SUMMARY OF THE INVENTION

The present invention provides an optical reflecting element that implements highly accurate self-excited driving. The element of the present invention includes a frame-shaped support body, a first low-frequency vibrator, a second low-frequency vibrator, a frame, a first high-frequency vibrator, a second high-frequency vibrator, and a mirror. The first ends of first and second low-frequency vibrators are connected to the inside of the support body. The second ends of first and second low-frequency vibrators are connected to the outside of the frame. The frame is disposed between the first and second low-frequency vibrators. The first ends of the first and second high-frequency vibrators are connected to the inside of the frame. The mirror is connected to the second ends of the first and second high-frequency vibrators, and disposed between the first and second high-frequency vibrators. Each of the first and second high-frequency vibrators includes a first drive unit for rotating the mirror around the first central axis and a first monitor element for measuring a rotation amountrive unit for rotating the frame and the mirror around the second central axis perpendicular to the first central axis. The second drive unit is composed of the substrate shared with the first drive unit, the bottom electrode layer shared with the first drive unit, the piezoelectric layer shared with the first drive unit, and the drive electrode shared with the first drive unit. The first low-frequency vibrator further includes the first monitor electrode shared with the first and second high-frequency vibrators, and an insulator layer provided between the first monitor electrode and the piezoelectric layer, as a dead zone for preventing a piezoelectric effect due to the piezoelectric layer from reaching the first monitor electrode. The second low-frequency vibrator further includes a second monitor element for measuring a rotation amount of the frame and the mirror. The first monitor electrode provided on the first low-frequency vibrator extends from the top of the first low-frequency vibrator to the top of the support body, and is connected to an extraction electrode provided on the support body. This structure improves the S/N ratio of a monitor signal output from the first monitor electrode, thereby increasing the detection accuracy of the first monitor element, which allows the optical reflecting element to be self-excitedly driven highly accurately.

DESCRIPTION OF EMBODIMENTS

First Exemplary Embodiment

Figure 1A:
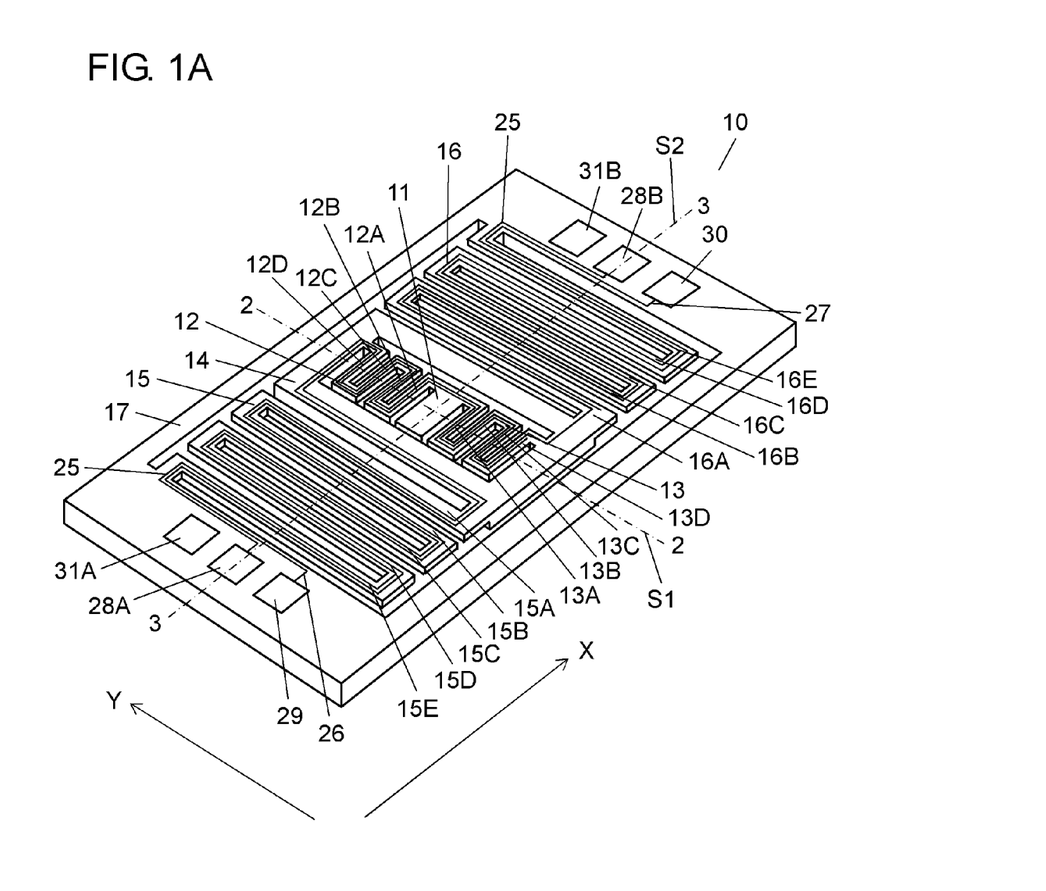
FIG. 1A is a perspective view of an optical reflecting element according to the first exemplary embodiment of the present invention.
Figure 1B:
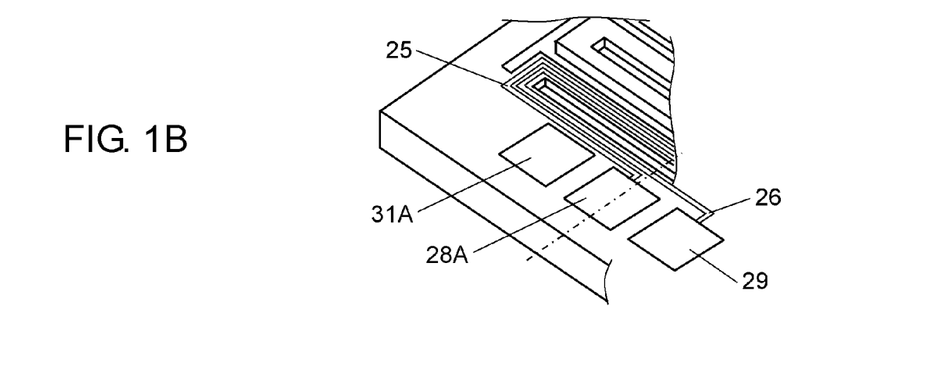
FIG. 1B is an enlarged view of the substantial part of the optical reflecting element shown in FIG. 1A.
Figure 2:
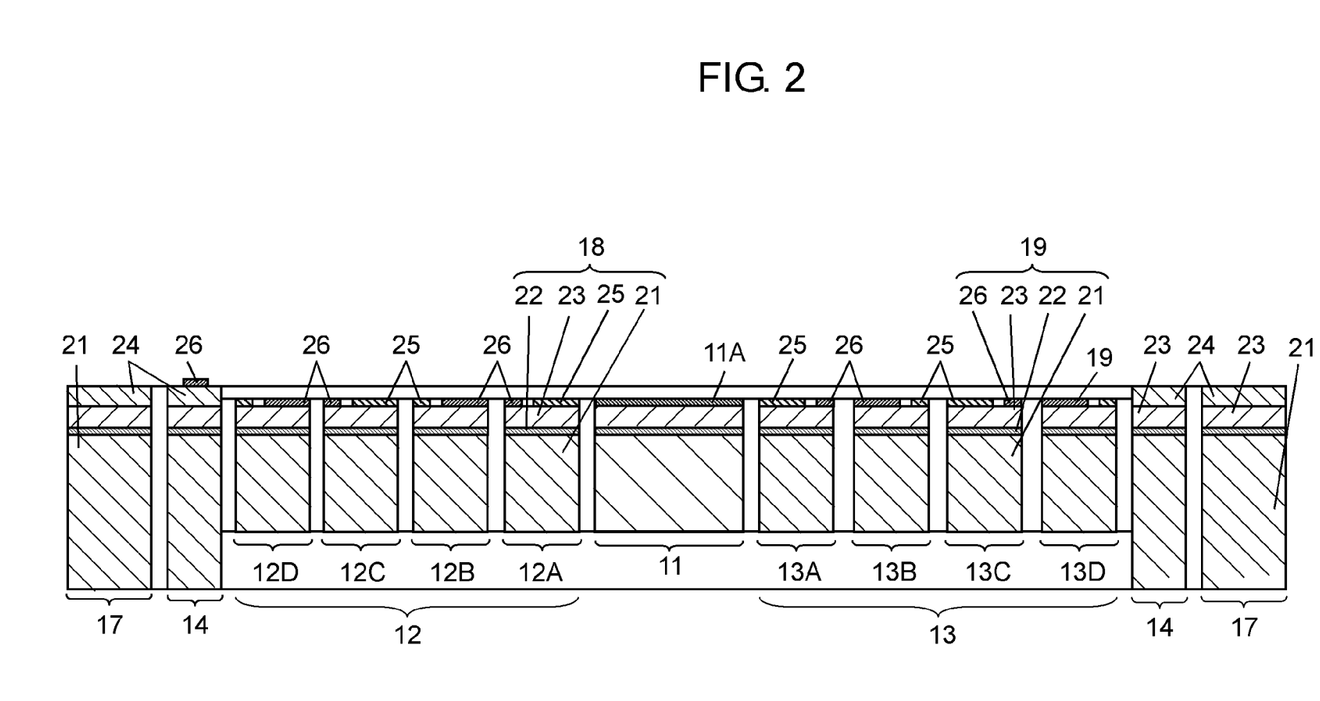
FIG. 2 is a cross sectional view of a high-frequency vibrator of the optical reflecting element shown in FIG. 1A.
Figure 3:
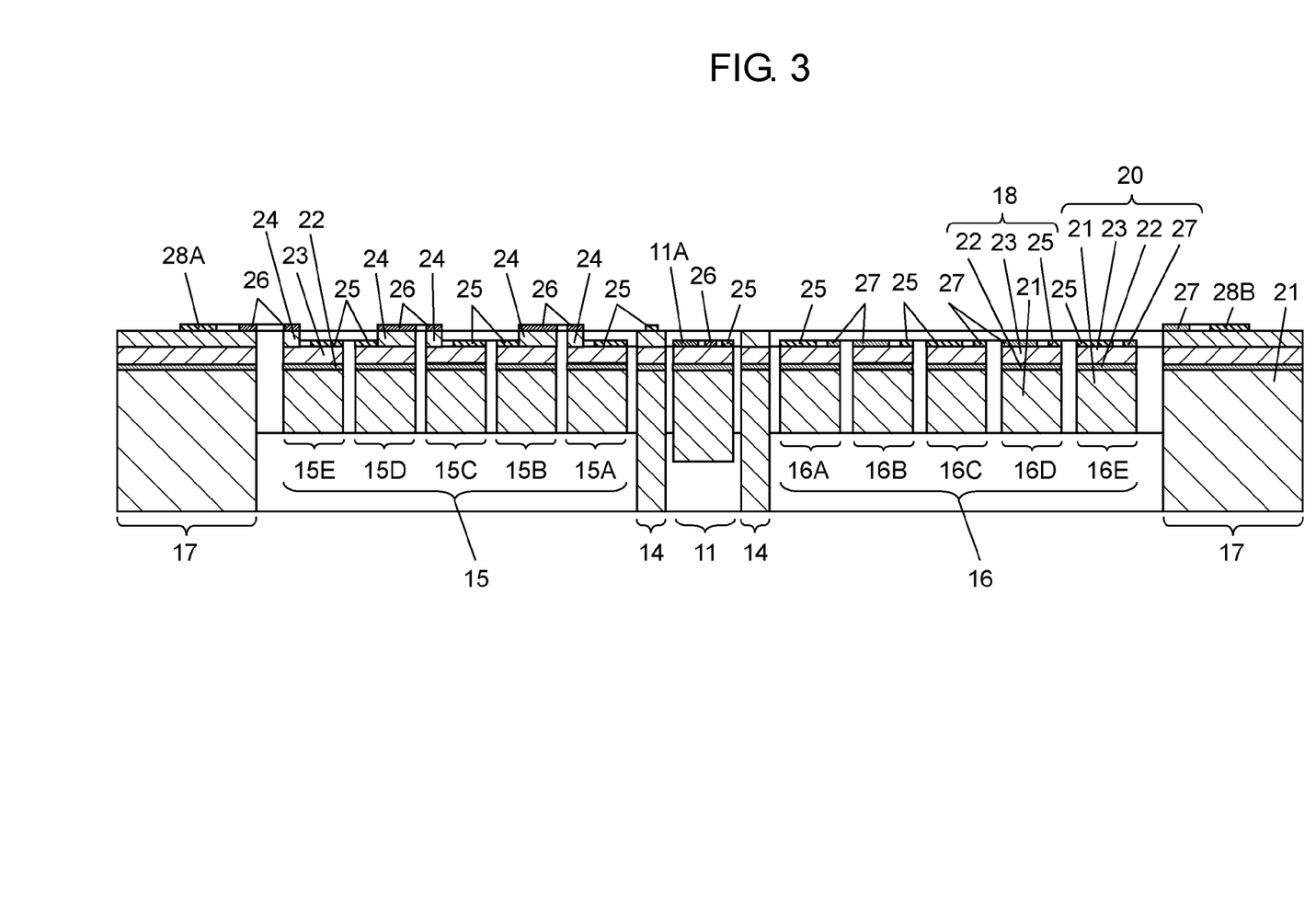
FIG. 3 is a cross sectional view of a low-frequency vibrator of the optical reflecting element shown in FIG. 1A.

FIG. 1A is a perspective view of an optical reflecting element according to the first exemplary embodiment of the present invention. FIG. 1B is an enlarged view of the substantial part of the optical reflecting element shown in FIG. 1A. FIG. 2 is a sectional view of the optical reflecting element shown in FIG. 1A, taken along line 2-2 (i.e. central axis S1), showing a cross section of the high-frequency vibrators; FIG. 3, taken along line 3-3 (i.e. central axis S2), showing a cross section of the low-frequency vibrators. As shown in FIG. 1A, optical reflecting element 10 according to the embodiment includes mirror 11, high-frequency vibrators 12 and 13 (i.e. first and second high-frequency vibrators), low-frequency vibrators 15 and 16 (i.e. first and second low-frequency vibrators), frame 14, and support body 17.

High-frequency vibrators 12 and 13 face each other with mirror 11 provided therebetween, and each is connected to the end of mirror 11 and to the inside of frame 14. In other words, frame 14 is connected to high-frequency vibrators 12 and 13, and encloses the outer circumference of high-frequency vibrators 12 and 13 and mirror 11. Low-frequency vibrators 15 and 16 are connected to the outside of frame 14 and to the inside of frame-shaped support body 17. In other words, support body 17 is connected to low-frequency vibrators 15 and 16, and encloses the outer circumference of low-frequency vibrators 15 and 16 and frame 14.

In this way, the first ends of low-frequency vibrators 15 and 16 are connected to the inside of support body 17. The second ends of low-frequency vibrators 15 and 16 are connected to the outside of frame 14. Frame 14 is disposed between low-frequency vibrators 15 and 16. The first ends of high-frequency vibrators 12 and 13 are connected to the inside of frame 14. Mirror 11 is connected to the second ends of high-frequency vibrators 12 and 13, and is disposed between high-frequency vibrators 12 and 13.

Central axis S1 (first central axis) of high-frequency vibrators 12 and 13 and central axis S2 (second central axis) of low-frequency vibrators 15 and 16 intersect at right angles at the barycenter of mirror 11. High-frequency vibrators 12 and 13 have line symmetry with respect to central axis S2 of low-frequency vibrators 15 and 16. In the same way, low-frequency vibrators 15 and 16 have line symmetry with respect to central axis S1 of high-frequency vibrators 12 and 13.

Further, high-frequency vibrators 12 and 13 respectively have diaphragms 12A through 12D and 13A through 13D, each parallel to the X axis (i.e. perpendicular to central axis S1). Diaphragms 12A through 12D and 13A through 13D are folded in a zigzag shape on the same plane and are connected. High-frequency vibrators 12 and 13 are thus meander-shaped. In the same way, low-frequency vibrators 15 and 16 respectively have diaphragms 15A through 15E and 16A through 16E, each parallel to the Y axis (i.e. perpendicular to central axis S2). Diaphragms 15A through 15E and 16A through 16E are folded in a zigzag shape on the same plane and are connected. Low-frequency vibrators 15 and 16 are thus meander-shaped as well.

High-frequency vibrators 12 and 13 and low-frequency vibrators 15 and 16 have different resonant drive frequencies, where their frequency ratio ranges from approximately 10 times to 200 times. For example, the resonance frequency of high-frequency vibrators 12 and 13 is approximately 10 kHz; low-frequency vibrators 15 and 16, approximately 200 Hz.

As shown in FIG. 2, diaphragms 12A through 12D and 13A through 13D respectively forming high-frequency vibrators 12 and 13 have respectively drive element 18 and first monitor element 19 disposed thereon. Drive element 18 is a first drive unit for rotating mirror 11 around central axis S1 of high-frequency vibrators 12 and 13. First monitor element 19 is used to detect vibration of high-frequency vibrators 12 and 13 to measure a rotation amount of mirror 11.

Drive element 18 is composed of substrate 21, bottom electrode layer 22, piezoelectric layer 23, and drive electrode 25. Bottom electrode layer 22 is provided on substrate 21, and piezoelectric layer 23 is stacked onto bottom electrode layer 22. Drive electrode 25 (i.e. the top electrode layer) is stacked onto piezoelectric layer 23. Drive electrode 25 is an electrode for applying drive signals.

First monitor element 19 is composed of first monitor electrode 26, substrate 21 shared with drive element 18, bottom electrode layer 22 shared with drive element 18, and piezoelectric layer 23 shared with drive element 18. First monitor electrode 26 (i.e. the top electrode layer) is isolated from drive electrode 25 on piezoelectric layer 23 and is stacked next to drive electrode 25. First monitor electrode 26 is an electrode for monitoring drive signals for high-frequency vibrators 12 and 13.

Meanwhile, as shown in FIG. 3, diaphragms 16A through 16E forming low-frequency vibrator 16 have drive element 18 and second monitor element 20 disposed thereon. Diaphragms 15A through 15E forming low-frequency vibrator 15 have drive element 18 and first monitor electrode 26 drawn out from first monitor element 19 of high-frequency vibrators 12 and 13 arranged thereon. Drive element 18 at low-frequency vibrators 15 and 16 is a second drive unit for rotating frame 14 and mirror 11 around central axis S2. Second monitor element 20 is provided to measure a rotation amount of frame 14 and mirror 11.

Drive element 18 is composed of substrate 21, bottom electrode layer 22, piezoelectric layer 23, and drive electrode 25. The elements forming drive element 18 are thus provided continuously across high-frequency vibrators 12 and 13 and low-frequency vibrators 15 and 16.

Second monitor element 20 is composed of second monitor electrode 27, substrate 21 shared with drive element 18, bottom electrode layer 22 shared with drive element 18, and piezoelectric layer 23 shared with drive element 18. Second monitor electrode 27 (i.e. the top electrode layer) is isolated from drive electrode 25 on piezoelectric layer 23 and is stacked next to drive electrode 25. Second monitor electrode 27 is an electrode for monitoring drive signals for low-frequency vibrators 15 and 16.

First monitor electrode 26 disposed on diaphragms 15A through 15E is provided in a dead zone of piezoelectric layer 23, namely in an area that the piezoelectric characteristics of piezoelectric layer 23 does not affect. In other words, low-frequency vibrator 15 has first monitor electrode 26 and a dead zone. First monitor electrode 26 is provided commonly with high-frequency vibrators 12 and 13. The dead zone is formed between first monitor electrode 26 and piezoelectric layer 23, preventing a piezoelectric effect due to piezoelectric layer 23 from reaching first monitor electrode 26.

Concretely, first monitor electrode 26 and piezoelectric layer 23 are provided therebetween with insulator layer 24 (i.e. a dead zone) with a high resistance value. More specifically, insulator layer 24 is provided on piezoelectric layer 23 provided above substrate 21, and first monitor electrode 26 is provided on insulator layer 24. Insulator layer 24 prevents piezoelectric layer 23 from being provided directly beneath first monitor electrode 26, and allows first monitor electrode 26 to be provided on the dead zone of piezoelectric layer 23.

Here, support body 17 is provided with extraction electrodes 28A, 29, and 31A at the side of low-frequency vibrator 15; extraction electrodes 28B, 30, and 31B at the side of low-frequency vibrator 16. Drive electrode 25 disposed on high-frequency vibrators 12 and 13 and on low-frequency vibrators 15 and 16 are drawn out to extraction electrodes 28A and 28B. That is, drive electrode 25 is connected to extraction electrode 28B from extraction electrode 28A through each top of low-frequency vibrator 15, high-frequency vibrator 12, mirror 11, high-frequency vibrator 13, and low-frequency vibrator 16.

As shown in FIG. 1B, first monitor electrode 26 disposed on high-frequency vibrators 12 and 13 and on mirror 11 is drawn out to the top of low-frequency vibrator 15 and to extraction electrode 29. That is, first monitor electrode 26 provided on low-frequency vibrator 15 extends from the top of low-frequency vibrator 15 to the top of support body 17, and is connected to extraction electrode 29 provided on support body 17.

Second monitor electrode 27 disposed on low-frequency vibrator 16 is drawn out to extraction electrode 30. Bottom electrode layer 22 forming drive element 18, first monitor element 19, and second monitor element 20 is drawn out to extraction electrodes 31A and 31B.

Here, in support body 17, particularly directly beneath the extraction electrode, an inner layer electrode (not shown) is stack-formed, to which respective bottom electrode layers 22 of drive element 18, first monitor element 19, and second monitor element 20 are connected. Extraction electrodes 31A and 31B are connected to bottom electrode layer 22 through the inner layer electrode.

Next, a description is made of the composition of each component material forming optical reflecting element 10. Substrate 21 is preferably made of a material having elasticity, mechanical strength, and high Young's modulus from the aspect of productivity, such as a silicon wafer and metal, glass, or ceramic substrate. For example, it is preferable to use metal, crystal, glass, quartz, or ceramic from the aspect of mechanical characteristics and availability. Silicon or a metal such as titanium, MgO, stainless-steel, elinvar, and brass alloy is preferable from the aspect of vibration characteristics and workability of optical reflecting element 10.

When a conductive material such as silicon is used for substrate 21, it is adequate if an insulating layer is provided between substrate 21 and bottom electrode layer 22, and substrate 21 and bottom electrode layer 22 are electrically isolated from each other. In this case, silicon dioxide is desirable for the insulating layer.

A piezoelectric material used for piezoelectric layer 23 is desirably one with a high piezoelectric constant, such a lead titanate zirconate (PZT).

Examples of a material of insulator layer 24 include a permanent resist. This type of resist is a chemical amplification negative resist based on epoxy resin. This resist produces strong acid when exposed, and heat treatment after the exposure promotes a crosslinking reaction in the resin by catalysis of the acid. Consequently, the material is highly resistant to common organic solvent, acids, and alkalis.

Here, applying the whole surface of piezoelectric layer 23 with insulator layer 24 and exposing it enables forming a pattern of insulator layer 24 on piezoelectric layer 23. After that, heat-treating it at 180 to 200° C. further promotes a crosslinking reaction, which improve resistance to common organic solvent, acids, and alkalis.

Other examples of a material of insulator layer 24 than a permanent resist include silicon dioxide and silicon nitride, which allows pattern-forming by photolithography or dry etching for example.

For bottom electrode layer 22, platinum improves crystallinity of piezoelectric layer 23. A material of the top electrode layer (i.e. drive electrode 25, first monitor electrode 26, and second monitor electrode 27) can be gold or titanium/gold for example.

Here, bottom electrode layer 22, piezoelectric layer 23, and the top electrode layer can be provided into thin film and stacked by vapor deposition, sol-gel process, CVD, or sputtering, for example.

Figure 4:
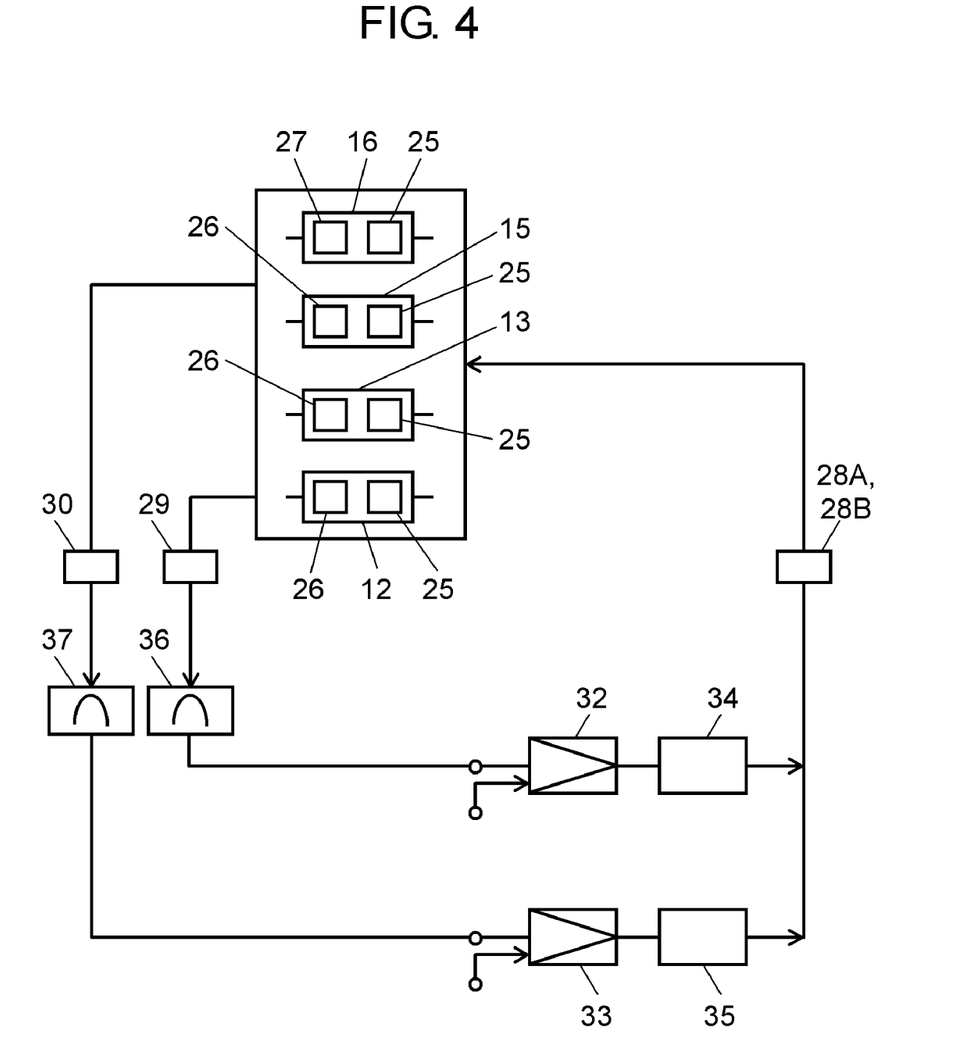
FIG. 4 is a block diagram for illustrating the driving circuit of the optical reflecting element shown in FIG. 1A.

As shown in FIGS. 2 and 3, the most part of the top surface of mirror 11 is covered with reflecting part 11A made of a highly reflective material such as aluminum. The other part of the top surface of mirror 11, on which reflection part 11A is not formed, has first monitor electrode 26 and drive electrode 25 provided thereon. Here, the most part of the top surface of mirror 11 may be covered with first monitor electrode 26. Such first monitor electrode 26 may be further stacked thereon with a highly reflective material such as aluminum. Mirror 11 shown in FIGS. 2 and 3 includes substrate 21, bottom electrode layer 22, and piezoelectric layer 23; however, the invention is not limited to this configuration. For example, without bottom electrode layer 22 and piezoelectric layer 23 provided on such a part of mirror 11, mirror 11 may be formed of only a substrate the top surface of which is on the plane same as the top surface of piezoelectric layer 23 of high-frequency vibrators 12 and 13, Next, a description is made of the way of driving an optical reflecting element according to the embodiment referring to FIG. 4. FIG. 4 is a block diagram for illustrating the driving circuit of optical reflecting element 10.

First, amplifier 32 receives an input of an electric signal (AC voltage) for driving high-frequency vibrators 12 and 13, and amplifies the signal. Amplifier 33 disposed parallel with amplifier 32 receives an input of an electric signal (AC voltage) for driving low-frequency vibrators 15 and 16, and amplifies the signal.

Here, high-frequency vibrators 12 and 13 receive an input of an electric signal having a vibration frequency intrinsic to vibrators 12 and 13, which resonantly drives vibrators 12 and 13. Low-frequency vibrators 15 and 16 receive an input of an electric signal having a vibration frequency intrinsic to vibrators 15 and 16, which resonantly drives vibrators 15 and 16. Herewith, high-frequency vibrators 12 and 13 and low-frequency vibrators 15 and 16 are always driven with their resonance frequencies, and thus efficiently, which increases the displacement to produce a large deflection angle.

Then, the above electric signals are combined through impedance elements 34 and 35, and are supplied to extraction electrodes 28A and 28B.

Then, the resultant electric signal flows from extraction electrodes 28A and 28B to drive electrode 25 shared with low-frequency vibrators 15 and 16 and high-frequency vibrators 12 and 13 to drive each drive element 18.

First monitor electrode 26 of first monitor element 19 disposed on high-frequency vibrators 12 and 13 detects displacement of high-frequency vibrators 12 and 13 as an electric signal. Then, the electric signal is drawn out to extraction electrode 29 through first monitor electrode 26 provided on low-frequency vibrator 15. Meanwhile, second monitor electrode 27 of second monitor element 20 disposed on low-frequency vibrator 16 detects displacement of low-frequency vibrator 16 as an electric signal. The electric signal is drawn out to extraction electrode 30.

The electric signal drawn out to extraction electrode 29 is extracted through filter 36, and is input into amplifier 32 again. In the same way, the electric signal drawn out to extraction electrode 30 is extracted through filter 37, and is input into amplifier 33 again. In this way, electric signals output from first monitor electrode 26 and second monitor electrode 27 are fed back to drive electrode 25 at high-frequency vibrators 12 and 13 and low-frequency vibrators 15 and 16. Herewith, optical reflecting element 10 is self-excitedly driven.

Other examples of impedance elements 34 and 35 than the above resistors include a reactance element such as a capacitor and a coil, and a combination of an impedance element and a reactance element.

In the above description, drive element 18 of high-frequency vibrators 12 and 13 and low-frequency vibrators 15 and 16 are applied with a combined electric signal. Consequently, drive electrode 25 (i.e. the shared top electrode layer) is provided on high-frequency vibrators 12 and 13 and low-frequency vibrators 15 and 16, and is routed as shown in FIG. 1A. However, another circuit configuration as well can drive optical reflecting element 10. For example, drive electrode 25 of high-frequency vibrators 12 and 13 and that of low-frequency vibrators 15 and 16 may be provided electrically independent of each other.

Figure 5:
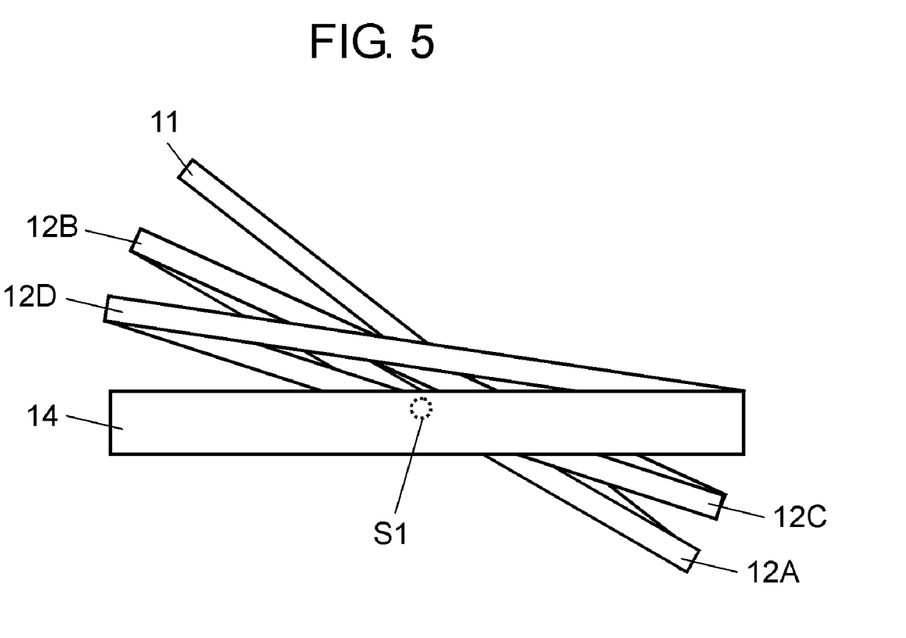
FIG. 5 is a schematic diagram showing operation of the high-frequency vibrator of the optical reflecting element shown in FIG. 1A.

Next, a description is made of operation of optical reflecting element 10. As shown in FIG. 2, diaphragms 12A through 12D and 13A through 13D of high-frequency vibrators 12 and 13 have wide drive element 18 (i.e. drive electrode 25) formed thereon alternately. Hence, by applying drive electrode 25 with an AC voltage (electric signal) with a resonance frequency of high-frequency vibrators 12 and 13, diaphragms 12A, 12C, 13A, and 13C with wide drive element 18 formed thereon flexurally vibrate in their thicknesswise direction. Then, diaphragms 12B, 12D, 13B, and 13D adjacent to diaphragms 12A, 12C, 13A, and 13C flexurally vibrate in the opposite direction on the resonance principle. Hence, diaphragms 12A through 12D and 13A through 13D vibrate alternately in opposite phase, which causes displacement to be accumulated centering on central axis S1 as shown in FIG. 5. As a result, mirror 11 can be rotate-vibrated iteratively to a large degree centering on central axis S1.

Here, diaphragms 12B, 12D, 13B, and 13D adjacent to diaphragms 12A, 12C, 13A, and 13C have thin-width drive element 18 formed thereon. Consequently, diaphragms 12B, 12D, 13B, and 13D are applied with substantially little voltage, which causes diaphragms 12B, 12D, 13B, and 13D to be displaced in a phase opposite to diaphragms 12A, 12C, 13A, and 13C.

In the same way, as shown in FIG. 3, diaphragms 15A through 15E and 16A through 16E of low-frequency vibrators 15 and 16 have wide drive element 18 (drive electrode 25) formed thereon alternately. Hence, by applying drive electrode 25 with an AC voltage (electric signal) with a resonance frequency of low-frequency vibrators 15 and 16, diaphragms 15A, 15C, 15E, 16A, 16C, and 16E flexurally vibrate in their thicknesswise direction. Then, diaphragms 15B, 15D, 16B, and 16D adjacent to diaphragms 15A, 15C, 15E, 16A, 16C, and 16E flexurally vibrate in the opposite direction on the resonance principle. Hence, diaphragms 15A through 15E and 16A through 16E vibrate alternately in opposite phase, which causes displacement to be accumulated centering on central axis S2. As a result, mirror 11 can be rotate-vibrated iteratively to a large degree centering on central axis S2.

Here, diaphragms 15B, 15D, 16B, and 16D adjacent to diaphragms 15A, 15C, 15E, 16A, 16C, and 16E have thin-width drive element 18 formed thereon. Consequently, diaphragms 15B, 15D, 16B, and 16D are applied with substantially little voltage, which causes diaphragms 15B, 15D, 16B, and 16D to be displaced in a phase opposite to diaphragms 15A, 15C, 15E, 16A, 16C, and 16E.

The above configuration enables optical reflecting element 10 to rotate mirror 11 in biaxial directions with its center being a fixed point.

Next, a description is made of some advantages in the embodiment. In optical reflecting element 10, first monitor electrode 26 routed along low-frequency vibrator 15 is routed in the dead zone of piezoelectric layer 23. Concretely, insulator layer 24 with a high resistance value is provided between first monitor electrode 26 and piezoelectric layer 23 disposed on diaphragms 15A through 15E forming low-frequency vibrator 15. This structure significantly reduces spurious resonance noise caused by an unnecessary signal in a higher-order vibration mode in low-frequency vibrator 15, which improves the S/N ratio of monitor signals, increases the detecting accuracy of first monitor element 19, and self-excitedly drives optical reflecting element 10 highly accurately. This enables reliably catching monitor signals and stably producing a large deflection angle independently of variation in resonance frequency.

Here, when the drive frequency is increased, the impedance decreases. As a result, the configuration of the embodiment is useful particularly for increasing the detection accuracy of first monitor element 19 of high-frequency vibrator 12 driven at a high frequency.

Drive electrode 25 is shared with high-frequency vibrators 12 and 13, and with low-frequency vibrators 15 and 16. This structure reduces the number of wirings of electrodes routed along optical reflecting element 10, which increases production efficiency while reducing inter-electrode interference.

High-frequency vibrators 12 and 13 and low-frequency vibrators 15 and 16 respectively vibrate diaphragms 12A through 12D and 13A through 13D; and diaphragms 15A through 15E and 16A through 16E alternately in opposite phase with one drive electrode 25 on the resonance principle to accumulate displacement. Consequently, the number of wirings can be reduced while maintaining a high drive efficiency.

Here, the positions where high-frequency vibrators 12 and 13 are connected to mirror 11 are desirably opposite to the positions where high-frequency vibrators 12 and 13 are connected to frame 14 with respect to a vibration axis. Such a structure enables the vibration axis to be close to axis S1 passing through the central part of mirror 11, thereby providing a larger mirror amplitude.

Here, high-frequency vibrators 12 and 13 have a bend connecting adjacent diaphragms, parallel with central axis S1. The length of each diaphragm parallel with central axis S2 may be changed to move the bend in the direction orthogonal to central axis S1 (i.e. in the direction parallel with central axis S2). Such a structure change enables a vibration axis to be close to axis S1 passing through the central part of mirror 11, which produces a large mirror amplitude.

In this embodiment, two electric signals are combined through an impedance element; however, they may be combined through a preliminary amplifier, a saturation amplifier, a bandpass filter, and an additive synthesis circuit for example. In this case, the circuit is formed of active elements, and thus can be formed into an IC chip, thereby streamlining the mounting process.

In this embodiment, high-frequency vibrators 12 and 13, and low-frequency vibrators 15 and 16 are meander-shaped; however, they are not limited to the shape. The invention is applicable even to other shapes such a cantilever, cross, tuning fork, for example.

Figure 6:
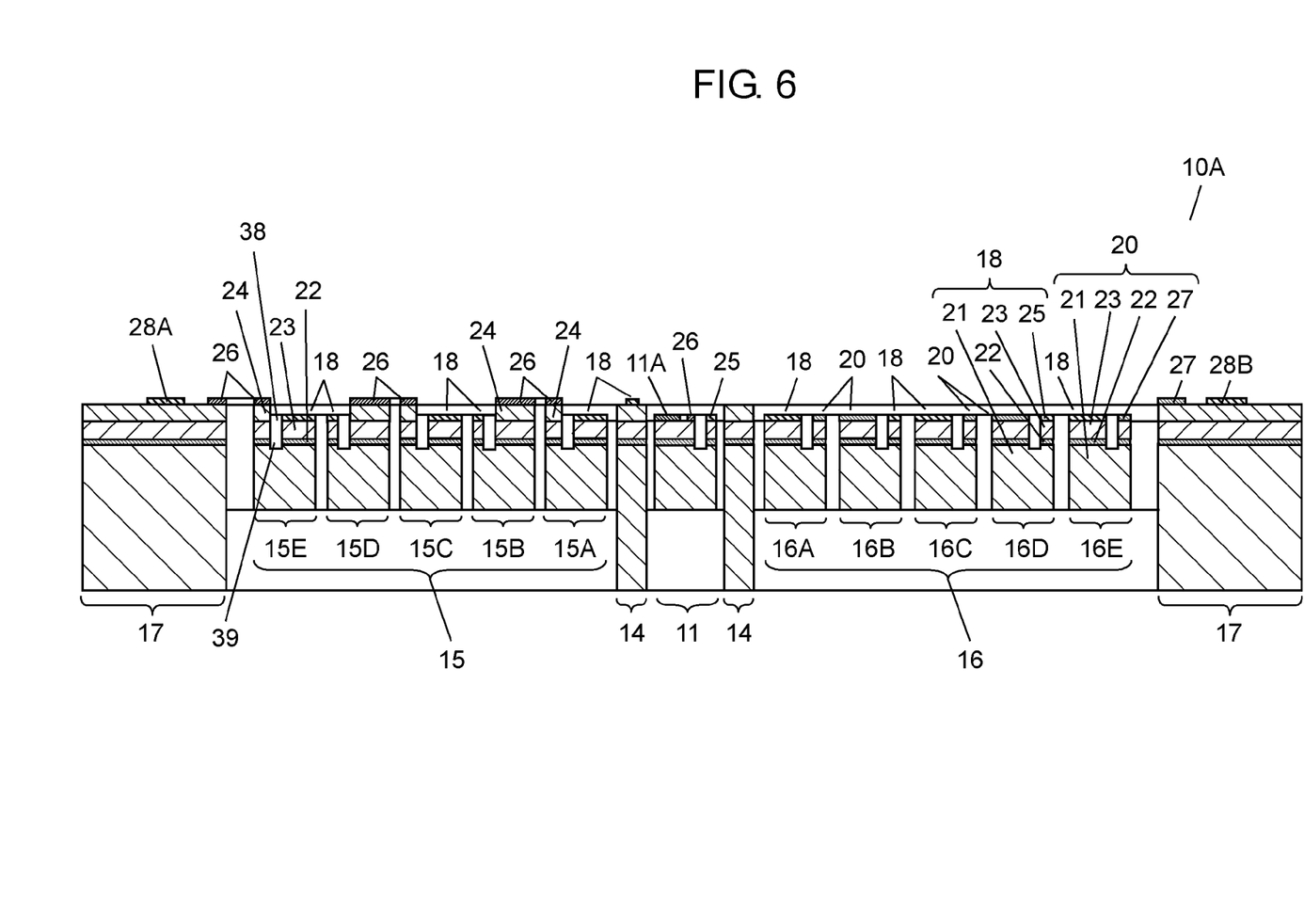
FIG. 6 shows a cross section of a low-frequency vibrator of another optical reflecting element according to the first embodiment of the present invention.

Next, a description is made of a further preferable structure of an optical reflecting element referring to FIG. 6. FIG. 6 shows a cross section of a low-frequency vibrator of another optical reflecting element according to the first embodiment of the present invention.

In optical reflecting element 10A shown in FIG. 6, drive element 18 and first monitor element 19 (or drive element 18 and second monitor element 20) are provided therebetween with dividing groove 38. Otherwise, element 10A is the same as element 10 shown in FIGS. 1A through 3.

Dividing groove 38 is formed to as far as substrate 21, and the bottom of dividing groove 38 forms groove 39 at substrate 21. Here, it is adequate if dividing groove 38 is deep enough to divide bottom electrode layer 22 at drive element 18 from bottom electrode layer 22 at first monitor element 19. Also, it is adequate if dividing groove 38 is deep enough to divide bottom electrode layer 22 at drive element 18 from bottom electrode layer 22 at second monitor element 20. With such a configuration, drive element 18 is separated from first monitor element 19; or drive element 18 is separated from second monitor element 20. Consequently, drive element 18 is electrically isolated from first monitor element 19 or from second monitor element 20.

Here, dividing groove 38 and groove 39 can be formed as follows. First, drive electrode 25, first monitor electrode 26, second monitor electrode 27, and insulator layer 24 are patterned by dry etching or wet etching, for example, to form dividing groove 38. After that, piezoelectric layer 23 and bottom electrode layer 22 are successively patterned by dry etching to form groove 39.

When substrate 21 is made of a conductive material such as silicon, an insulating layer is further provided between substrate 21 and bottom electrode layer 22. As a result that dividing groove 38 is formed so that the bottom (groove 39) of dividing groove 38 reaches insulator layer 24 or substrate 21 (i.e. the lower layer of layer 24), drive electrode 25 is electrically isolated reliably from first monitor electrode 26 or from second monitor electrode 27. In this case, the insulating layer is desirably silicon dioxide that is a natural or thermal oxide film of silicon.

Such a configuration allows optical reflecting element 10A to significantly reduce unnecessary noise signals in a higher-order vibration mode in low-frequency vibrator 15, and to reduce leaks between drive element 18 and first monitor element 19, thereby increasing the detection accuracy of first monitor electrode 26 and self-excitedly driving optical reflecting element 10A highly accurately.

In other words, in optical reflecting element 10A, bottom electrode layer 22 of first monitor element 19 and second monitor element 20 is electrically isolated from bottom electrode layer 22 of drive element 18 by dividing groove 38. This structure reduces spurious resonance noise caused by signals in a higher-order vibration mode, and prevents a leak current from flowing between first monitor element 19 and drive element 18, or between second monitor element 20 and drive element 18.

Further, both high-frequency vibrators 12 and 13, and low-frequency vibrators 15 and 16 are etched until groove 39 is formed in substrate 21. This process enables layer 22 to be isolated almost reliably so that capacitive coupling or conduction does not occur between drive electrode 25, and first monitor electrode 26 and second monitor electrode 27 due to residues of bottom electrode layer 22. Hence, even for a long wiring distance of bottom electrode layer 22, a leak current can be reduced between drive electrode 25 and first monitor electrode 26, or between drive electrode 25 and second monitor electrode 27.

For optical reflecting element 10A requiring a large amplitude, high-frequency vibrators 12 and 13, and low-frequency vibrators 15 and 16 are sometimes formed meander-shaped, resulting in an extremely long vibrator beam. Furthermore, first monitor electrode 26 is routed along low-frequency vibrator 15, resulting in a further longer vibrator beam. In this case, the wiring distance of bottom electrode layer 22 is extended as well, which means bottom electrode layer 22 is inadequately grounded. Even in such a case, providing dividing groove 38 allows reducing a leak current between first monitor element 19 and drive element 18, or between second monitor element 20 and drive element 18.

Forming dividing groove 38 so as to reach substrate 21 prevents a conductive and dielectric substance from adhering, thereby further reducing leaks.

The bottom surface of groove 39 is formed flat; however, the cross section of groove 39 may be shaped gradually deeper from its outer circumference towards its center. This structure lengthens the isolation distance between bottom electrode layer 22 of drive element 18 and bottom electrode layer 22 of first monitor element 19 to reduce leaks. Even if a conductive or dielectric component adheres to groove 39, the real distance is longer than the case where the bottom surface is flat. This structure further reduces leaks between bottom electrode layer 22 of drive element 18 and bottom electrode layer 22 of first monitor element 19; or between bottom electrode layer 22 of drive element 18 and bottom electrode layer 22 of second monitor element 20.

Second Exemplary Embodiment

Figure 7:
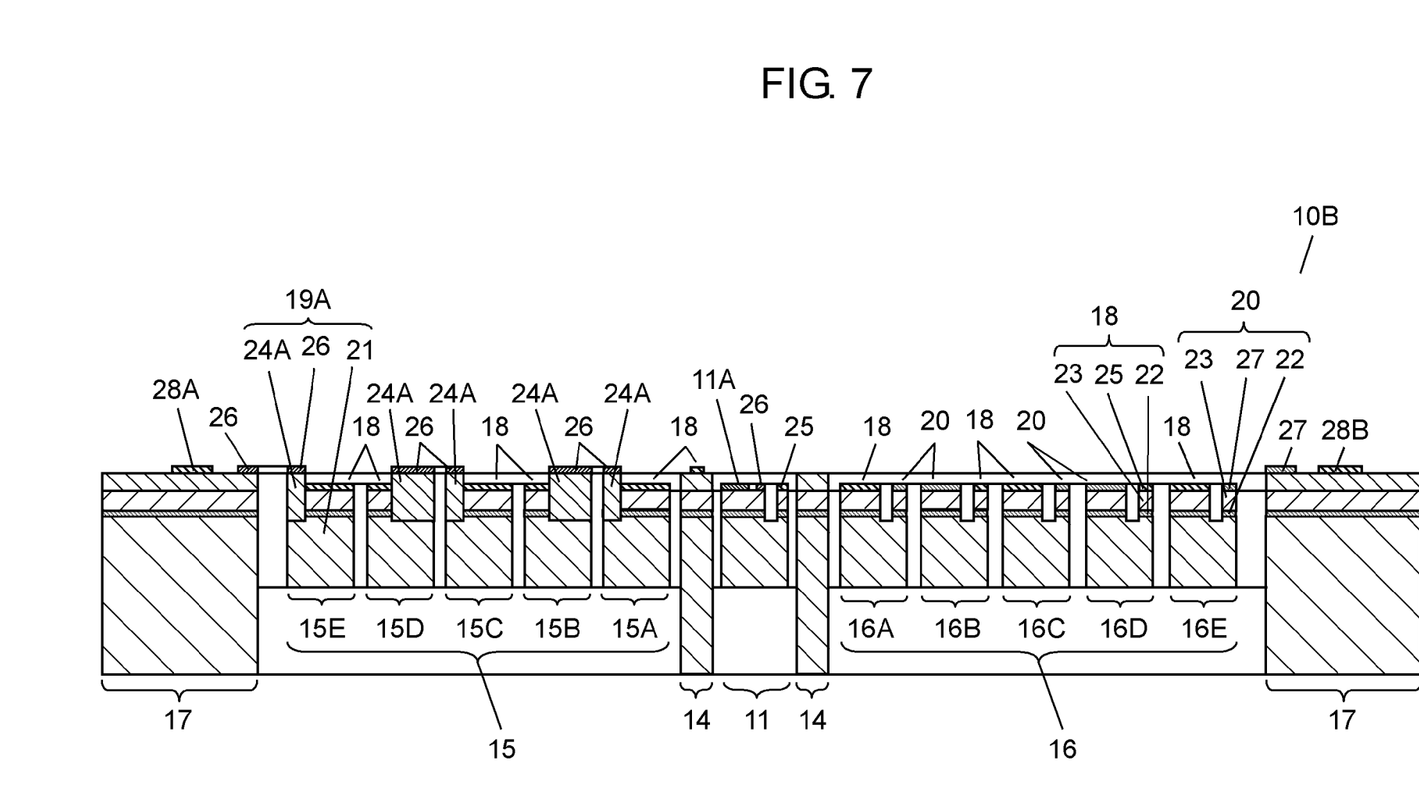
FIG. 7 shows a cross section of a low-frequency vibrator of an optical reflecting element according to the second exemplary embodiment of the present invention.

Hereinafter, a description is made of optical reflecting element 10B according to the second exemplary embodiment of the present invention using FIG. 7. FIG. 7 shows a cross section of a low-frequency vibrator of an optical reflecting element according to the second embodiment of the present invention. For a component same as that of the first embodiment, its description is omitted, and the differences are described in detail.

Optical reflecting element 10B is provided with insulator layer 24A on substrate 21 on diaphragms 15A through 15E of low-frequency vibrator 15, and first monitor electrode 26 is provided on insulator layer 24A. That is to say, piezoelectric layer 23 and bottom electrode layer 22 are not provided under first monitor electrode 26, but only insulator layer 24A and substrate 21 are provided to form first monitor element 19A. This point is different from the first embodiment. In FIG. 7, low-frequency vibrator 16 has the same structure as that in FIG. 6; however, may have the same structure as that in FIG. 2. Insulator layer 24A can be made of a material same as that of insulator layer 24.

Even with such a configuration, first monitor electrode 26 is provided on insulator layer 24A (i.e. the dead zone of piezoelectric layer 23). Insulator layer 24A is provided between first monitor electrode 26 and piezoelectric layer 23. Even this configuration prevents a piezoelectric effect due to piezoelectric layer 23 from reaching first monitor electrode 26. That is to say, the configuration significantly reduces influence of unnecessary noise signals in a higher-order vibration mode in low-frequency vibrator 15 on first monitor electrode 26. Further, leaks between drive element 18 and first monitor element 19A are reduced, thereby increasing the detection accuracy of first monitor electrode 26 and self-excitedly driving optical reflecting element 10B highly accurately. Furthermore, this structure is easier in micromachining than that of FIG. 6 in the first embodiment, and thus is advantageous in downsizing and productivity of the elements.

Practical Example

Next, a description is made of the results of the following examination referring to FIGS. 8A through 9C. That is, optical reflecting elements 10A and 10B are formed with the configurations of the first (FIG. 6) and second embodiments, and effects of improving respective S/N ratios are examined.

Figure 8A:
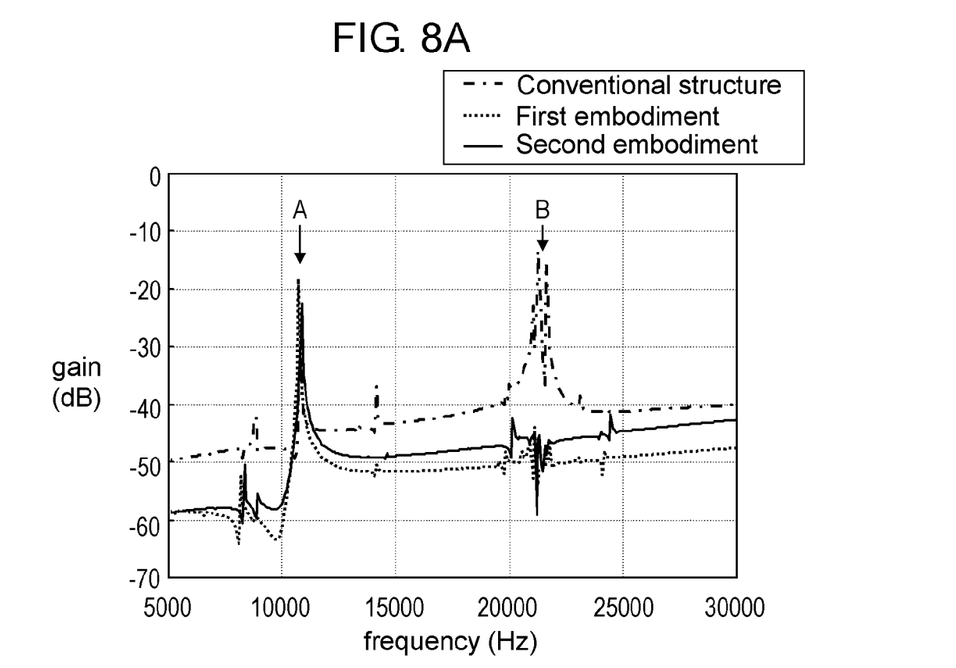
FIG. 8A is a frequency characteristic diagram showing noise signal levels of a first monitor element of an optical reflecting element according to the embodiments of the present invention and that of a conventional one.
Figure 8B:
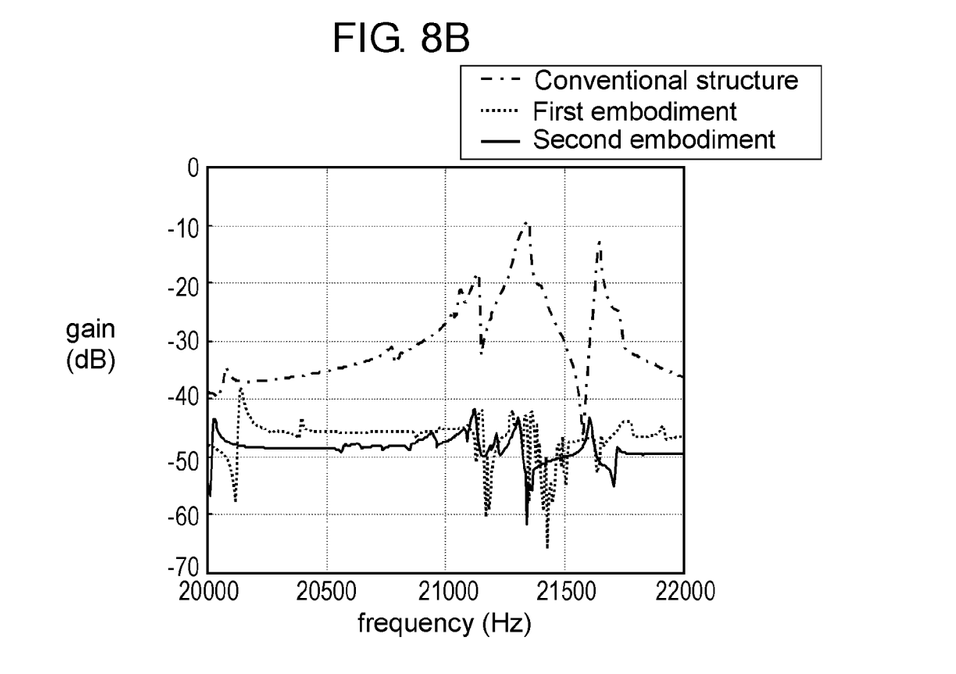
FIG. 8B is an enlarged view of the frequency characteristic diagram shown in FIG. 8A.

FIG. 8A is a frequency characteristic diagram showing noise signal levels of first monitor elements of an optical reflecting element according to the embodiments of the present invention and that of a conventional one. FIG. 8B is its enlarged view, showing the vicinity of peak B. The horizontal axis represents the drive frequency; the vertical axis, the level of the noise signal from a first monitor element. Peak A indicates a drive frequency (basic mode) of the optical reflecting element; peak B indicates a higher-order vibration mode induced by this drive vibration. In this example, peak A is set around approximately 10,000 Hz, and peak B occurs around 20,000 Hz.

Figure 9A:
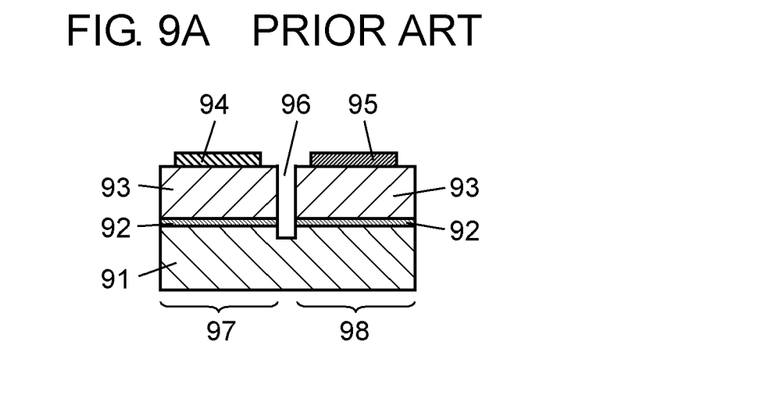
FIG. 9A is a sectional view of the substantial part of a low-frequency vibrator of a conventional optical reflecting element.
Figure 9B:
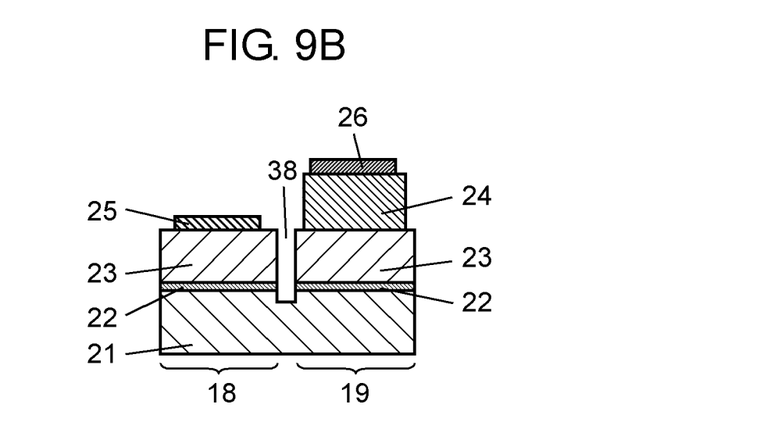
FIG. 9B is a sectional view of the substantial part of the low-frequency vibrator of the optical reflecting element shown in FIG. 6.
Figure 9C:
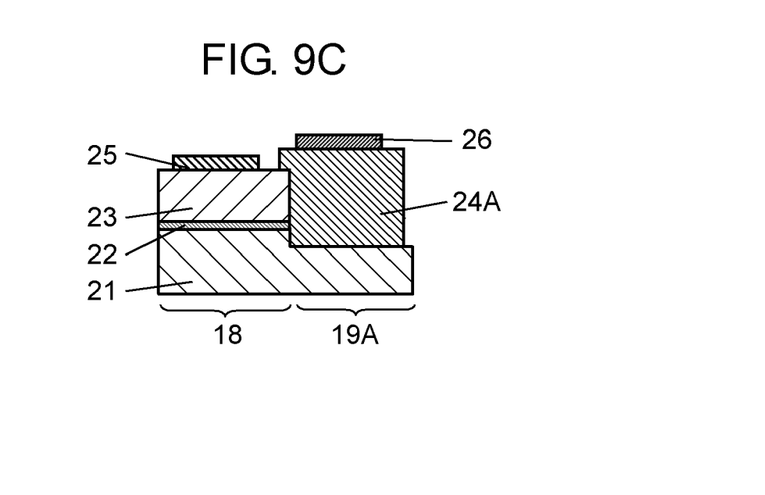
FIG. 9C is a sectional view of the substantial part of the low-frequency vibrator of the optical reflecting element shown in FIG. 7.

The conventional optical reflecting element for reference shown in FIG. 9A includes drive element 97 and monitor element 98. Drive element 97 is composed of substrate 91, bottom electrode layer 92, piezoelectric layer 93, and drive electrode 94. Monitor element 98 is composed of substrate 91, bottom electrode layer 92, piezoelectric layer 93, and first monitor electrode 95. Drive element 97 is separated from monitor element 98 by dividing groove 96 penetrating through bottom electrode layer 92 and a part of substrate 91. In the configuration of the first embodiment, as shown in FIG. 9B, drive element 18 is separated from monitor element 19 by dividing groove 38, and insulator layer 24 is provided between first monitor electrode 26 and piezoelectric layer 23. In the configuration of the second embodiment, as shown in FIG. 9C, piezoelectric layer 23 is removed together with bottom electrode layer 22 and a part of substrate 21, and then insulator layer 24A and first monitor electrode 26 are formed. That is, drive element 18 is separated from first monitor element 19A without a dividing groove formed.

FIGS. 8A and 8B prove that, with the configurations of the first and second embodiments, the level of noise signals is largely attenuated and the frequency characteristics are flat at the frequency corresponding peak B, which is in a higher-order vibration mode.

In this way, by using the configurations of a first monitor element according to the embodiments, signals in a higher-order mode produced by a drive signal are reliably separated and reduced for the first monitor element formed. increases the S/N ratio of signals from the first monitor element to drive the optical reflecting element highly accurately.

INDUSTRIAL APPLICABILITY

An optical reflecting element of the present invention is capable of self-excited driving with a higher degree of accuracy than a conventional one, and thus is applicable to an image projector such as a heads-up display and head-mounted display.

REFERENCE MARKS IN THE DRAWINGS 10, 10A, 10B Optical reflecting element
11 Mirror
11A Reflection part
12, 13 High-frequency vibrator
12A, 12B, 12C, 12D, 13A, 13B, 13C, 13D Diaphragm
14 Frame
15, 16 Low-frequency vibrator
15A, 15B, 15C, 15D, 15E, 16A, 16B, 16C, 16D, 16E Diaphragm
17 Support body
18 Drive element
19, 19A First monitor element
20 Second monitor element
21, 91 Substrate
22, 92 Bottom electrode layer
23, 93 Piezoelectric layer
24, 24A Insulator layer (dead zone)
25, 94 Drive electrode
26, 95 First monitor electrode
27 Second monitor electrode
28A, 28B, 29, 30, 31A, 31B Extraction electrode
32, 33 Amplifier
34, 35 Impedance element
36, 37 Filter
38, 96 Dividing groove
39 Groove

The invention claimed is:

1. An optical reflecting element comprising:
a frame-shaped support body;
a first low-frequency vibrator whose first end is connected to an inside of the support body;
a second low-frequency vibrator whose first end is connected to an inside of the support body;
a frame of which outside is connected to second ends of the first and second low-frequency vibrators, the frame disposed between the first and second low-frequency vibrators;
a first high-frequency vibrator whose first end is connected to an inside of the frame;
a second high-frequency vibrator whose first end is connected to an inside of the frame; and
a mirror connected to second ends of the first and second high-frequency vibrators, the mirror disposed between the first and second high-frequency vibrators,
wherein each of the first and second high-frequency vibrators includes:
a first drive unit for rotating the mirror around a first central axis of the first and second high-frequency vibrators; and
a first monitor element for measuring a rotation amount of the mirror,
wherein the first drive unit includes:
a substrate;
a bottom electrode layer provided on the substrate;
a piezoelectric layer provided on the bottom electrode layer; and
a drive electrode provided on the piezoelectric layer,
wherein the first monitor element includes:
the substrate shared with the first drive unit;
the bottom electrode layer shared with the first drive unit;
the piezoelectric layer shared with the first drive unit; and
a first monitor electrode provided on the piezoelectric layer, wherein each of the first and second low-frequency vibrators includes a second drive unit for rotating the frame and the mirror around a second central axis perpendicular to the first central axis, wherein the second drive unit includes:
- the substrate shared with the first drive unit;
- the bottom electrode layer shared with the first drive unit;
- the piezoelectric layer shared with the first drive unit; and
- the drive electrode shared with the first drive unit, wherein the first low-frequency vibrator further includes:
- the first monitor electrode shared with the first and second high-frequency vibrators; and
- an insulator layer provided between the first monitor electrode and the piezoelectric layer, the insulator layer being a dead zone for preventing a piezoelectric effect due to the piezoelectric layer from reaching the first monitor electrode, wherein the second low-frequency vibrator further includes a second monitor element for measuring a rotation amount of the frame and the mirror, and wherein the first monitor electrode provided on the first low-frequency vibrator extends from a top of the first low-frequency vibrator to the support body and is connected to an extraction electrode provided on the support body.

2. The optical reflecting element of claim 1,
wherein the insulator layer of the first low-frequency vibrator is provided on the piezoelectric layer provided above the substrate, and
wherein the first monitor electrode of the first low-frequency vibrator is provided on the insulator layer.

3. The optical reflecting element of claim 1,
wherein the insulator layer of the first low-frequency vibrator is provided on the substrate, and
wherein the first monitor electrode of the first low-frequency vibrator is provided on the insulator layer.

4. The optical reflecting element of claim 1,
wherein a dividing groove is provided between each of: the drive electrode and the first monitor electrode of the first low-frequency vibrator; the drive electrode and the second monitor electrode of the second low-frequency vibrator; and the drive electrode of the first and second high-frequency vibrators and the first monitor electrode of the first and second high-frequency vibrators, and
wherein each of the dividing grooves is deep enough to divide at least the bottom electrode layer.

5. The optical reflecting element of claim 1, wherein the first and second low-frequency vibrators and the first and second high-frequency vibrators have a frequency ratio ranging from approximately 10 times to 200 times.

6. The optical reflecting element of claim 1, wherein each of the first and second high-frequency vibrators and each of the first and second low-frequency vibrators are disposed such the first central axis and second central axis intersect at right angles at a barycenter of the mirror.

7. The optical reflecting element of claim 4, wherein a bottom surface of the dividing groove is flat.

8. The optical reflecting element of claim 4, wherein a cross-sectional bottom surface of the dividing groove is gradually deeper moving from an outer circumference towards a center thereof.

9. The optical reflecting element of claim 5, wherein the first and second low-frequency vibrators and the first and second high-frequency vibrators have a frequency ratio of approximately 50 times.

10. The optical reflecting element of claim 1, wherein the first and second high-frequency vibrators have a bend connecting adjacent diaphragms, the bend connecting the adjacent diaphragms being parallel with the first central axis.

* * * * *